(12) United States Patent
Donnard

(10) Patent No.: US 7,562,893 B2
(45) Date of Patent: Jul. 21, 2009

(54) HITCH COUPLING ASSEMBLY WHICH DAMPENS THE HUNTING MOVEMENTS OF A ROAD TRAILER

(75) Inventor: Réné Donnard, Westhoffen (FR)

(73) Assignee: Lohr Industrie, Hangenbieten (FR)

( * ) Notice: Subject to any disclaimer, the term of this patent is extended or adjusted under 35 U.S.C. 154(b) by 521 days.

(21) Appl. No.: 10/562,042

(22) PCT Filed: Jun. 17, 2004

(86) PCT No.: PCT/FR2004/001518

§ 371 (c)(1),
(2), (4) Date: Feb. 15, 2006

(87) PCT Pub. No.: WO2005/002889

PCT Pub. Date: Jan. 13, 2005

(65) Prior Publication Data

US 2006/0138746 A1    Jun. 29, 2006

(30) Foreign Application Priority Data

Jun. 27, 2003  (FR) ................... 03 07783

(51) Int. Cl.
B60D 1/32 (2006.01)
B62D 53/02 (2006.01)
(52) U.S. Cl. ................... 280/492; 280/455.1
(58) Field of Classification Search ........... 280/455.1, 280/492, 493, 504, 511, 512, 514
See application file for complete search history.

(56) References Cited

U.S. PATENT DOCUMENTS

| 2,871,030 | A | | 1/1959 | Hollis | |
|---|---|---|---|---|---|
| 3,519,287 | A | | 7/1970 | Pontbriand | |
| 3,801,133 | A | | 4/1974 | Thompson | |
| 4,213,627 | A | * | 7/1980 | Thompson | 280/406.2 |
| 4,711,461 | A | * | 12/1987 | Fromberg | 280/494 |
| 5,186,483 | A | * | 2/1993 | Sheppard | 280/494 |
| 5,647,604 | A | * | 7/1997 | Russell | 280/492 |

(Continued)

FOREIGN PATENT DOCUMENTS

CH    675858    11/1990

(Continued)

*Primary Examiner*—Paul N Dickson
*Assistant Examiner*—Marc A Scharich
(74) *Attorney, Agent, or Firm*—Davis & Bujold, P.L.L.C.

(57) ABSTRACT

The invention relates to an improved hitch coupling assembly which dampens the hunting movements of a road trailer being towed by a motor vehicle and which is intended for a vehicle combination comprising a motor vehicle and a trailer. More specifically, the inventive hitch coupling assembly (4) comprises: (i) a first pivot coupling (12) for the hunting movements, consisting of a pivoting device which dampens the hunting movements (40) of the trailer and which is housed in a closed space such that it is sheltered from the ingress of pollutant materials; and (ii) a second coupling (21) for the rolling and pitching movements, which is used for the play-free transmission of the hunting movements to the first coupling, the axis of the hunting movements being thus decoupled from the rolling and pitching movements. The damping device preferably comprises a stack of friction disks (41) which are alternately solidly connected to the vehicle or the trailer and which pivot in relation to one another under the effect of the hunting movements.

20 Claims, 6 Drawing Sheets

U.S. PATENT DOCUMENTS

| | | | |
|---|---|---|---|
| 6,502,847 B1 * | 1/2003 | Greaves | 280/494 |
| 6,991,247 B1 * | 1/2006 | Hahne et al. | 280/493 |
| 7,032,919 B1 * | 4/2006 | Hahne et al. | 280/493 |

FOREIGN PATENT DOCUMENTS

| | | |
|---|---|---|
| DE | 25 27 673 | 12/1976 |
| DE | 77 18 934 | 9/1977 |
| FR | 1074895 | 10/1954 |
| FR | 2044031 | 2/1971 |
| FR | 2796887 | 2/2001 |

* cited by examiner

HITCH COUPLING ASSEMBLY WHICH DAMPENS THE HUNTING MOVEMENTS OF A ROAD TRAILER

This application is a national stage completion of PCT/FR2004/001518 filed Jun. 17, 2004 which claims priority from French Application Serial No. 03/07783 filed Jun. 27, 2003.

FIELD OF THE INVENTION

This invention generally relates to a coupling for a vehicle assembly composed of a motor vehicle and a trailer, comprising a device for damping yaw motions by the road trailer. More specifically, it concerns an articulating coupling assembly housing an improved yaw damping device with a brake which may be formed of at least one friction disc or a plurality of friction discs.

This articulating coupling assembly is more specifically designed to improve road traction in a vehicle assembly formed of a motor vehicle and a trailer with central axles, also known as a balanced trailer, and upkeep of the yaw damping device.

It is well known that there are risks and dangers inherent in yaw movement by trailers, particularly during descent at certain speeds, during sudden course deviation maneuvers, and especially during evasive action or if the cargo is not evenly distributed.

These risks are so great that they may actually cause the trailer to tip over or be positioned diagonally in the so-called "portfolio" configuration.

BACKGROUND OF THE INVENTION

Numerous devices already exist for limiting yaw movement.

They generally consist of lateral telescoping arms with a damping effect. These arms are mounted on either side of a coupling and connected by a ball and socket joint to the rear of the motor vehicle and by a ball and socket joint on the other end to the coupling or to the trailer.

Unfortunately, these arms limit steering angles and modify kinematics. Furthermore, they are especially cumbersome.

Other devices also exist for damping yaw movement, such as those described in Patent Nos. FR 2,796,887, FR 2,044,031, DE 25 27 673A, DE 77 18 934U and CH 675 858 A, consisting of a curved portion or a section of metallic discs and a bracket attached to the tiller of the trailer and equipped with two friction slides. These slides are pressed firmly against either side of the curved portion or the disc section by a pneumatic or elastic device which serves to brake the pivoting motions of the tiller in relation to the towing vehicle using friction and to damp the yaw movements of the trailer.

While satisfactory from the functional point of view, these existing damping systems are cumbersome and restrictive to use, since they necessitate a fairly high level of upkeep by the user.

In practice, since the friction surface is limited, the friction slides tend to wear out rapidly during use and need regular replacement in order for the device to continue to be effective.

Moreover, it is difficult for a driver to have to remember to check for wear on the slides.

In addition, damping devices of this type are located on the exterior and have no physical protection. They are exposed to the elements, incoming pollution, and attack by abrasive material such as sand, gravel, as well as liquids, oily substances, etc., which collect on the friction surfaces. All of these factors increase wear considerably on the friction slides because irregular wear translates rapidly into uniform wear.

Furthermore, with pneumatic or hydraulic systems the user must also monitor hydraulic or pneumatic pressure to ensure that the device remains reliable.

Due to the controls and maintenance requirements, the usefulness of such a device is therefore quite limited.

These prior art systems also present the problem of bulk in the area of the coupling between the motor vehicle and its trailer. They are actually quite cumbersome and must be attached in an area where numerous flexible elements and other structural connectors pass.

Yet another coupling device is described in U.S. Pat. No. 3,801,133. It comprises a ball articulation and two bars associated with the tow bar and connected to the tiller of the trailer. During yaw movements, these paired bars pivot about an axle that coincides with the axle of the ball articulation. The two bars are joined transversely by a connecting rod, the upper portion of which supports a friction plate that rubs against a friction coating covering a semi-circular extension of the main body of the coupling device connected to the towing vehicle.

When the bars pivot, a cam device causes a different force to be applied to each of these bars, thereby modifying the distribution of compression force between the friction surfaces so that the force exerted is not uniform, but is stronger on one of the bars.

This prior art device has disadvantages similar to those described previously.

SUMMARY OF THE INVENTION

As in the other systems, this damping device is located on the exterior, in an area that is already crowded, and it has no physical protection, thereby increasing the amount of wear on its friction surfaces. Moreover, the relative pivoting of the bars during yaw movements results in rubbing that is neither flat nor uniform, which causes the friction surfaces to wear out considerably faster and decreases the effectiveness of the damping.

The goal of the invention is to provide a system for damping and thereby limiting the amplitude of yaw movement by a trailer in a vehicle assembly consisting of a motor vehicle towing a trailer that eliminates the disadvantages described above.

To achieve this goal, the damping device has been integrated inside the articulating coupling assembly, which conserves an equivalent amount of space. This eliminates all the problems relating to the size of the annexed device. In addition, the damping device is housed inside the coupling hook and therefore protected from contact with exterior elements such as abrasive material or oily substances. This reduces wear considerably and guaranties the user a long period of utility before the friction surfaces need replacement.

According to current regulations, articulating devices or coupling hooks of this type must be able to transmit yaw movement of ±90°, pitching movement of ±8°, and rolling movement of ±3°, as well as the combination of these three elementary characteristic motions.

According to an essential claimed feature, the axle for yaw motion has been disconnected from the axles for rolling motion and for pitching motion in the articulating coupling assembly of the invention.

The articulating coupling assembly of the invention is characterized by a first pivot articulation to allow yaw movement and comprising a pivoting device for damping yaw movements by the trailer, and a second articulation for rolling and pitching movement, with the axle for yaw movement being disconnected from the axles for rolling and pitching movement.

The device for damping yaw movements preferably comprises at least one disc cooperating with at least one opposing surface applied to the disc by a compression system exerting axial compression force on the disc(s), at least one of the opposing surfaces consisting of a friction surface.

Preferably, damping of the yaw movement is obtained through dry friction on a stack of friction discs alternately connected to the motor vehicle or to the trailer, pivoting in relation to one another under the influence of the yaw movement.

Because of this stacking, the friction surfaces are multiplied, thereby considerably decreasing wear on the surfaces and extending the life of the system.

Advantageously, disconnecting the yaw axle on the one hand and the rolling and pitching axles on the other hand results in rubbing that remains constantly even, that is, under good conditions, i.e., without any intervening force on the friction discs. Wear is thus greatly reduced in proportion to reduced angular speed and the larger disc radius.

The invention also offers an articulating coupling assembly for damping yaw movement that requires only extremely limited maintenance on the part of the user and offers a long period of use with its original components. In actuality, the stated goal is for the user to be required to replace the friction discs a maximum of one time over the life of the trailer, with the ideal being a maintenance-free damping device, that is, a device with a lifespan comparable to or greater than that of the trailer, approximately one million kilometers.

BRIEF DESCRIPTION OF THE DRAWINGS

Other features and advantages of the invention will be apparent from the following description provided by way of non-limiting example, with reference to the drawings, wherein.

DETAILED DESCRIPTION OF THE INVENTION

Figure 1:
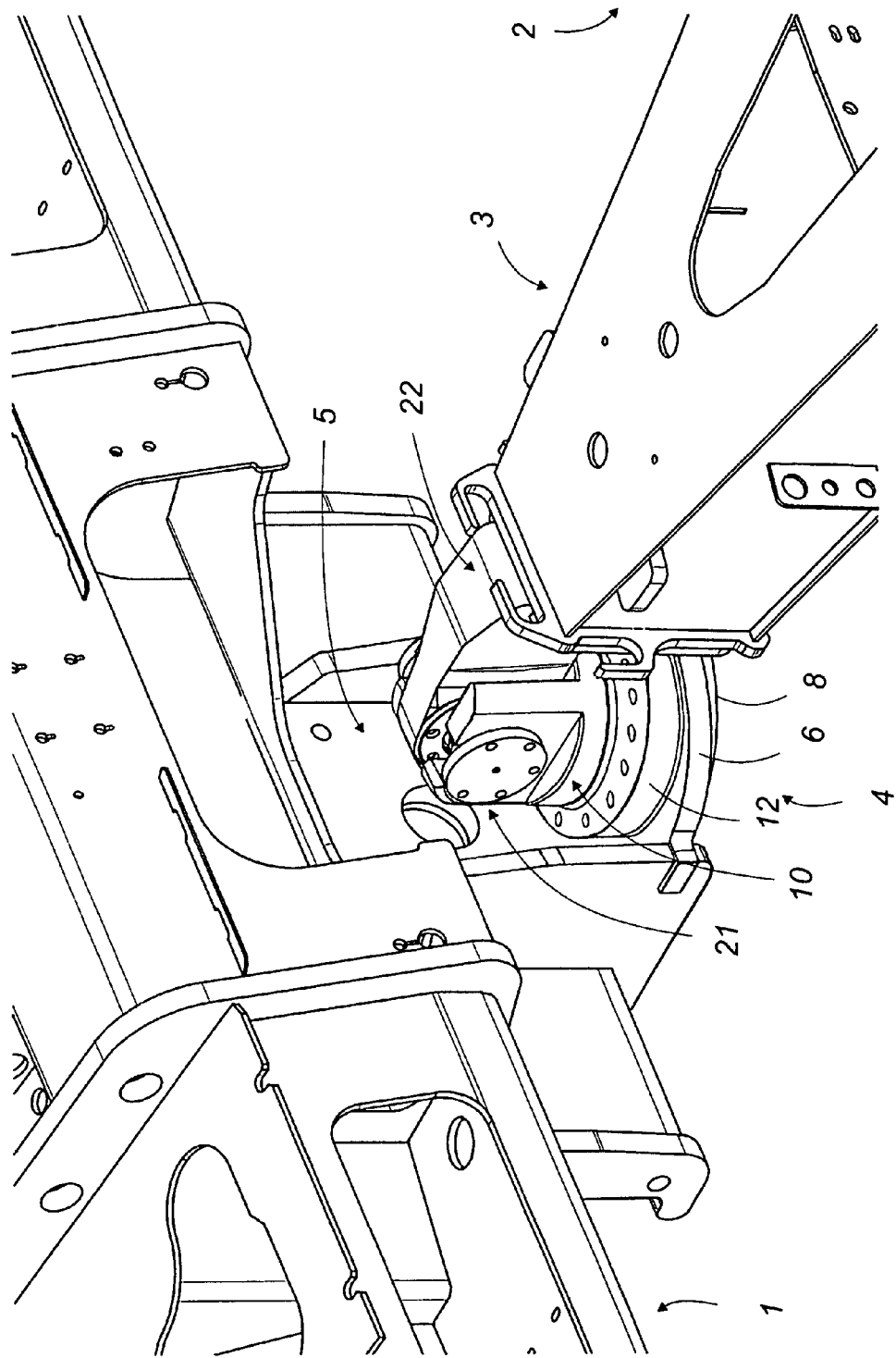
FIG. 1 is a general overhead perspective and oblique view of the rear of the motor vehicle and a first variation of the articulating trailer coupling assembly according to the invention.
Figure 2:
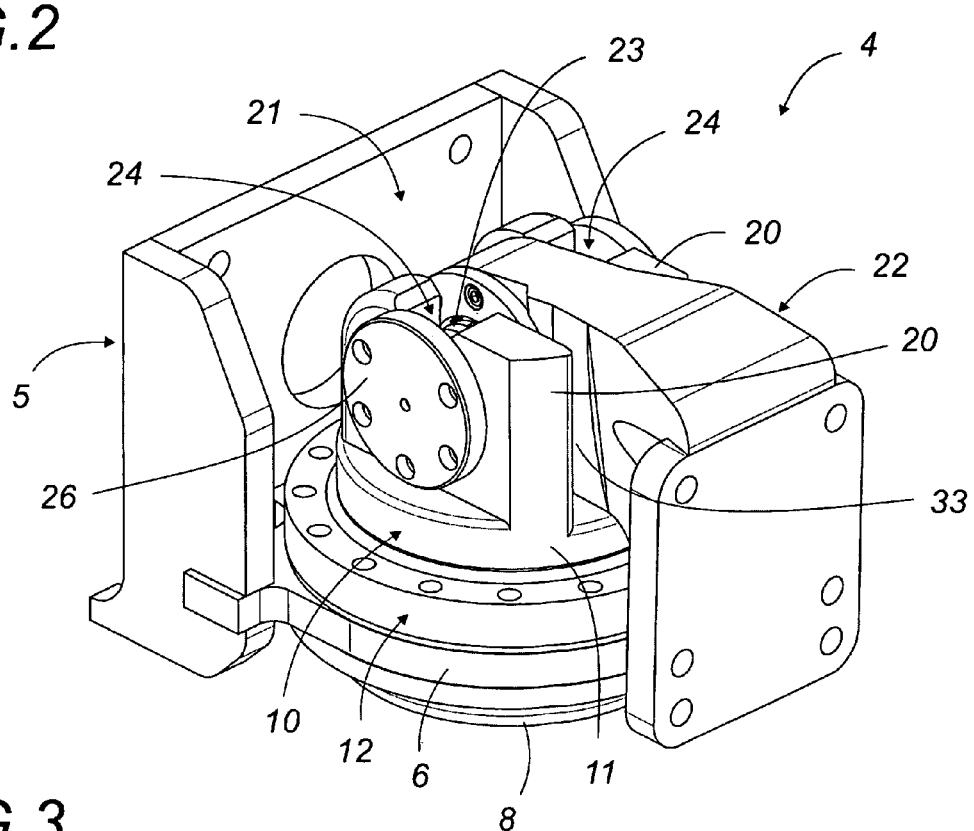
FIG. 2 is a perspective view for this first variation of the articulating coupling assembly for damping yaw movement according to the invention.
Figure 3:
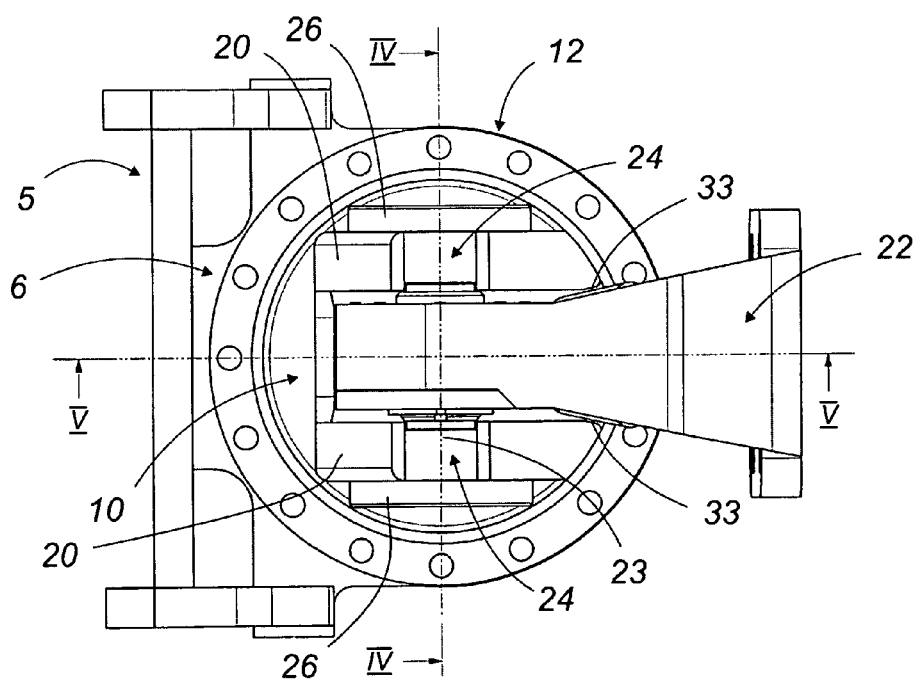
FIG. 3 is a plane view of the first variation of the articulating coupling assembly according to the invention.
Figure 4:
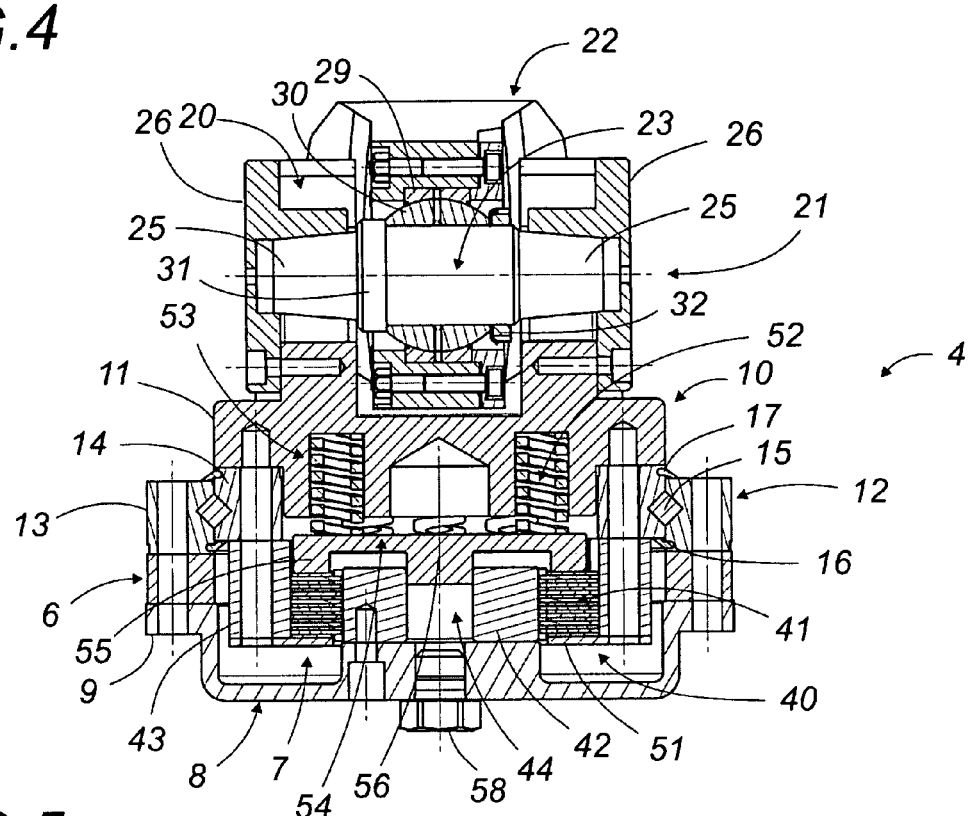
FIG. 4 is a longitudinal cross-section taken along line IV-IV of FIG. 3 of the first variation of the articulating coupling assembly according to the invention.
Figure 5:
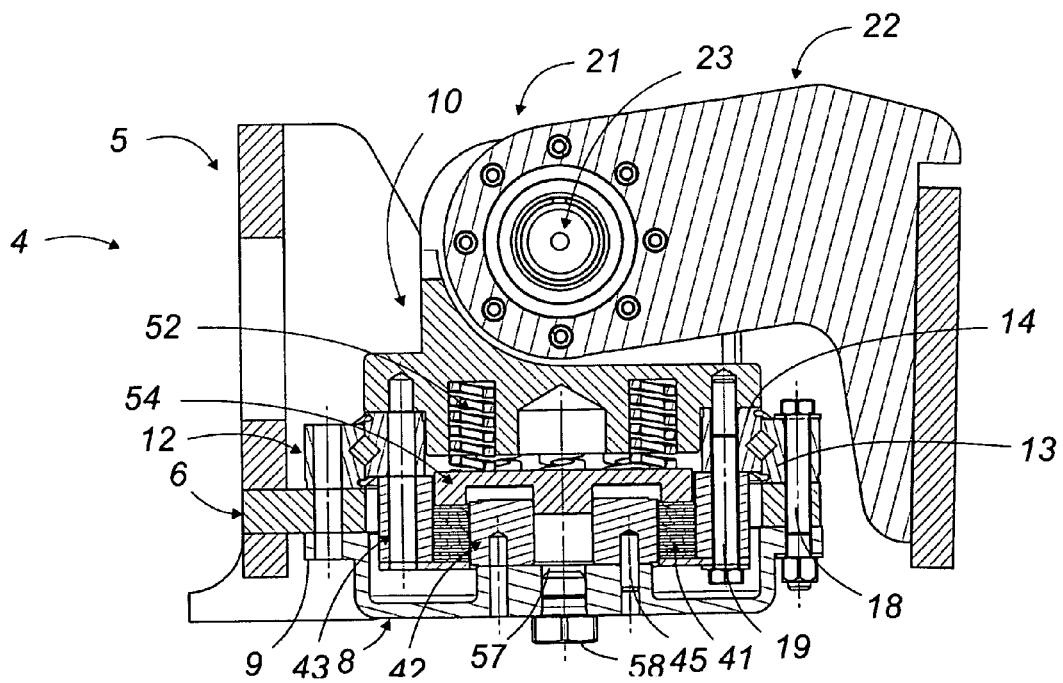
FIG. 5 is a transverse cross-section taken along line V-V of FIG. 3 of the first variation of the articulating coupling assembly according to the invention.
Figure 6:
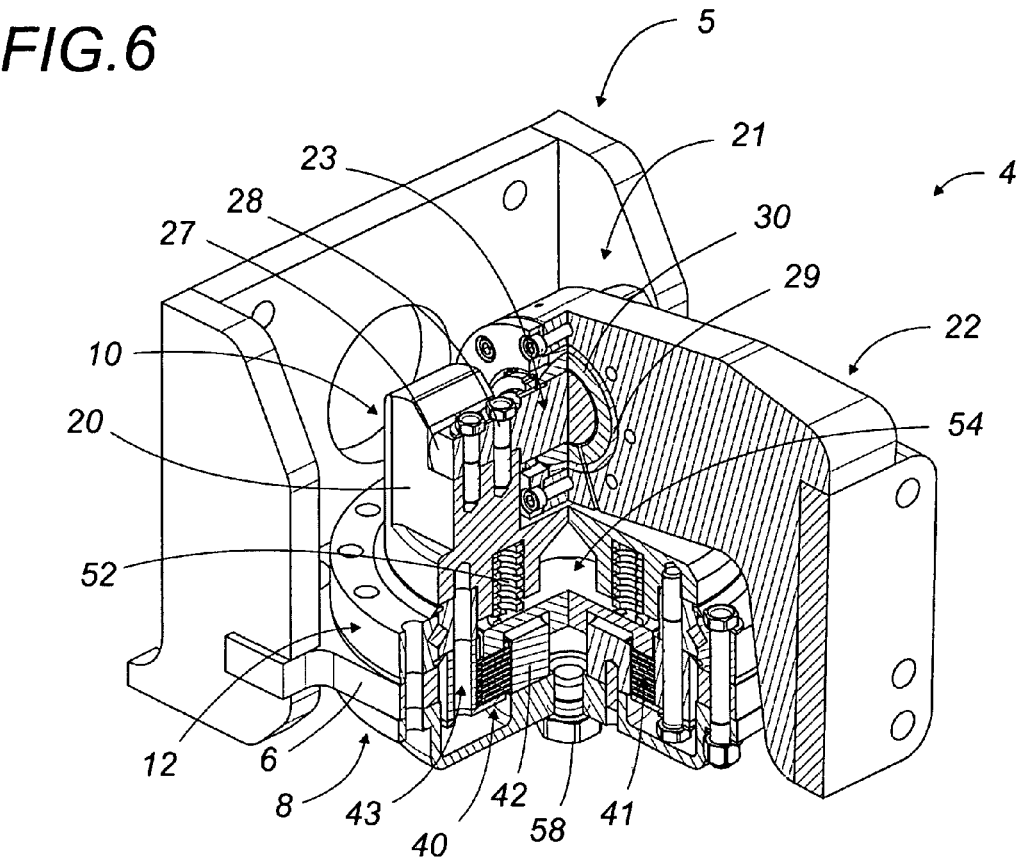
FIG. 6 is a perspective partially in cross-section of a second variation of the articulating coupling assembly according to the invention, with the rear quarter in the first plane being truncated.
Figure 7:
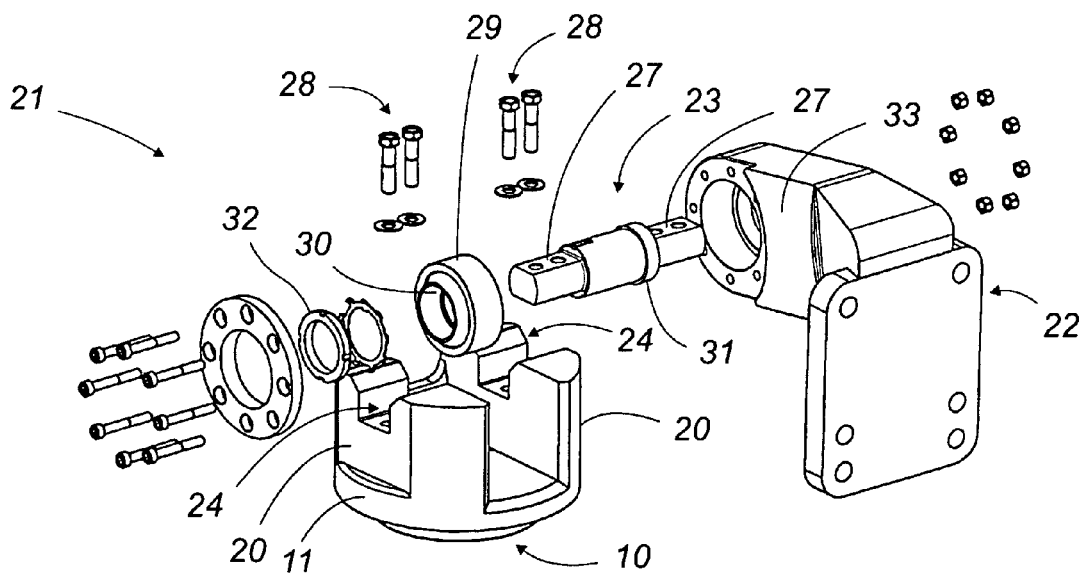
FIG. 7 is an exploded perspective of the principal elements constituting articulation for pitching and rolling in the articulating coupling assembly according to the second variation of the invention.
Figure 8:
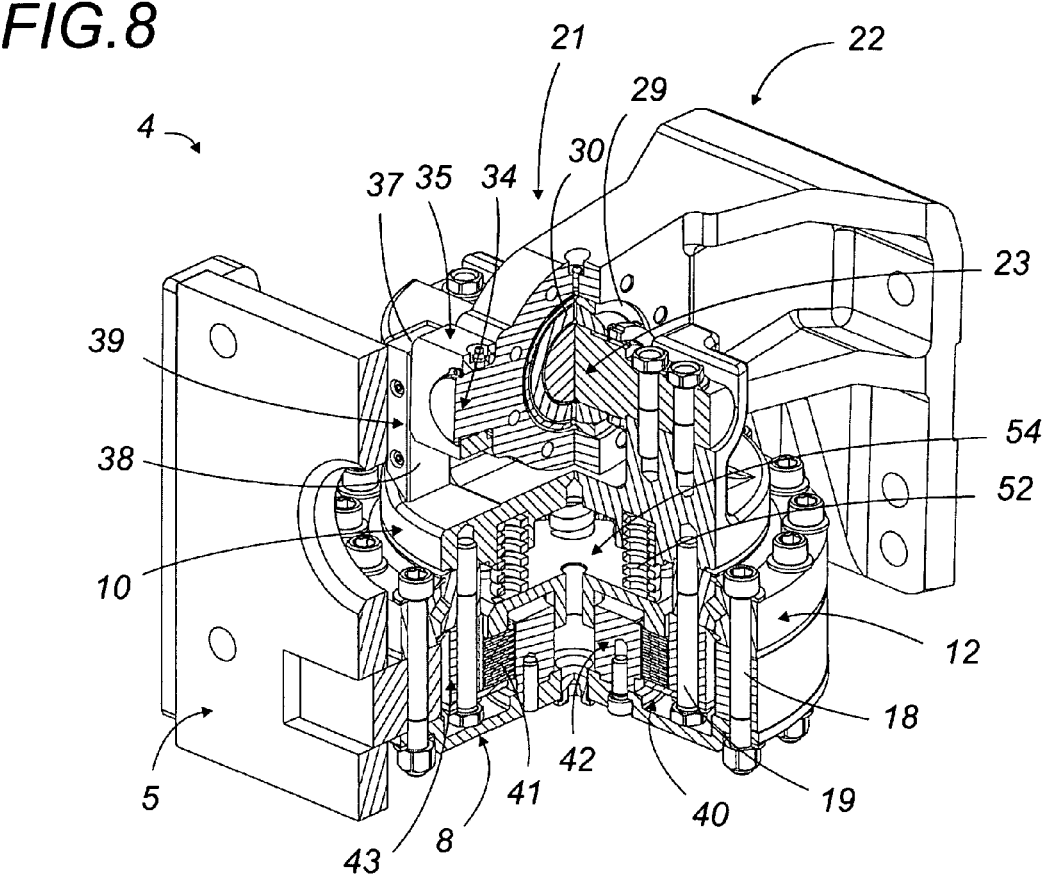
FIG. 8 is a perspective partially in cross-section of a third variation of the articulating coupling assembly according to the invention, with the front quarter in the first plane being truncated.
Figure 9:
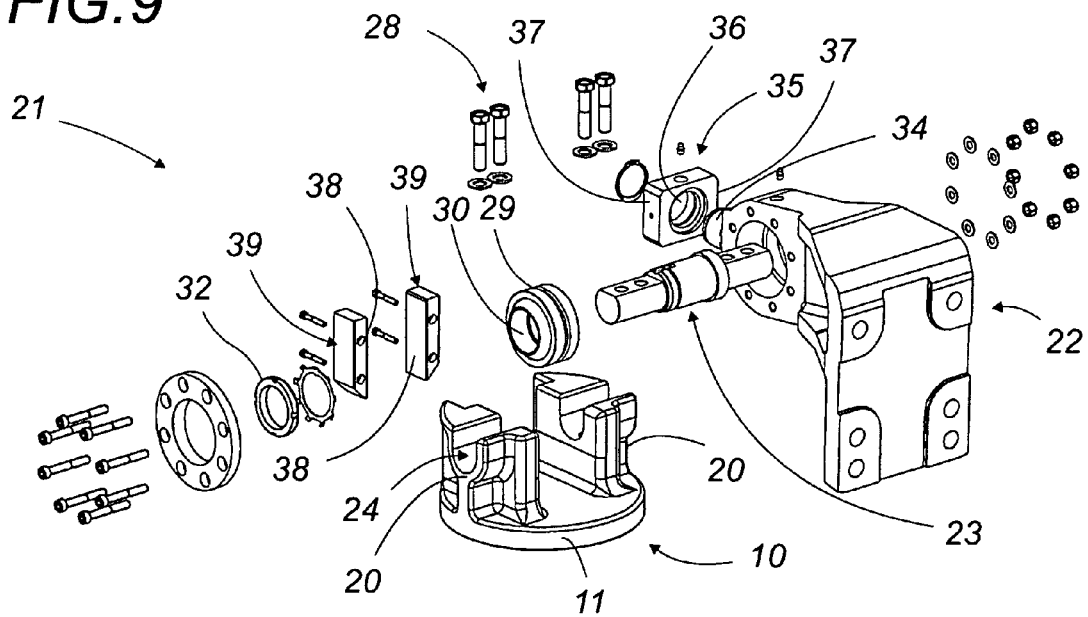
FIG. 9 is an exploded perspective of the principal elements constituting the articulation for pitching and rolling in the articulating coupling assembly according to the third variation of the invention.
Figure 10:
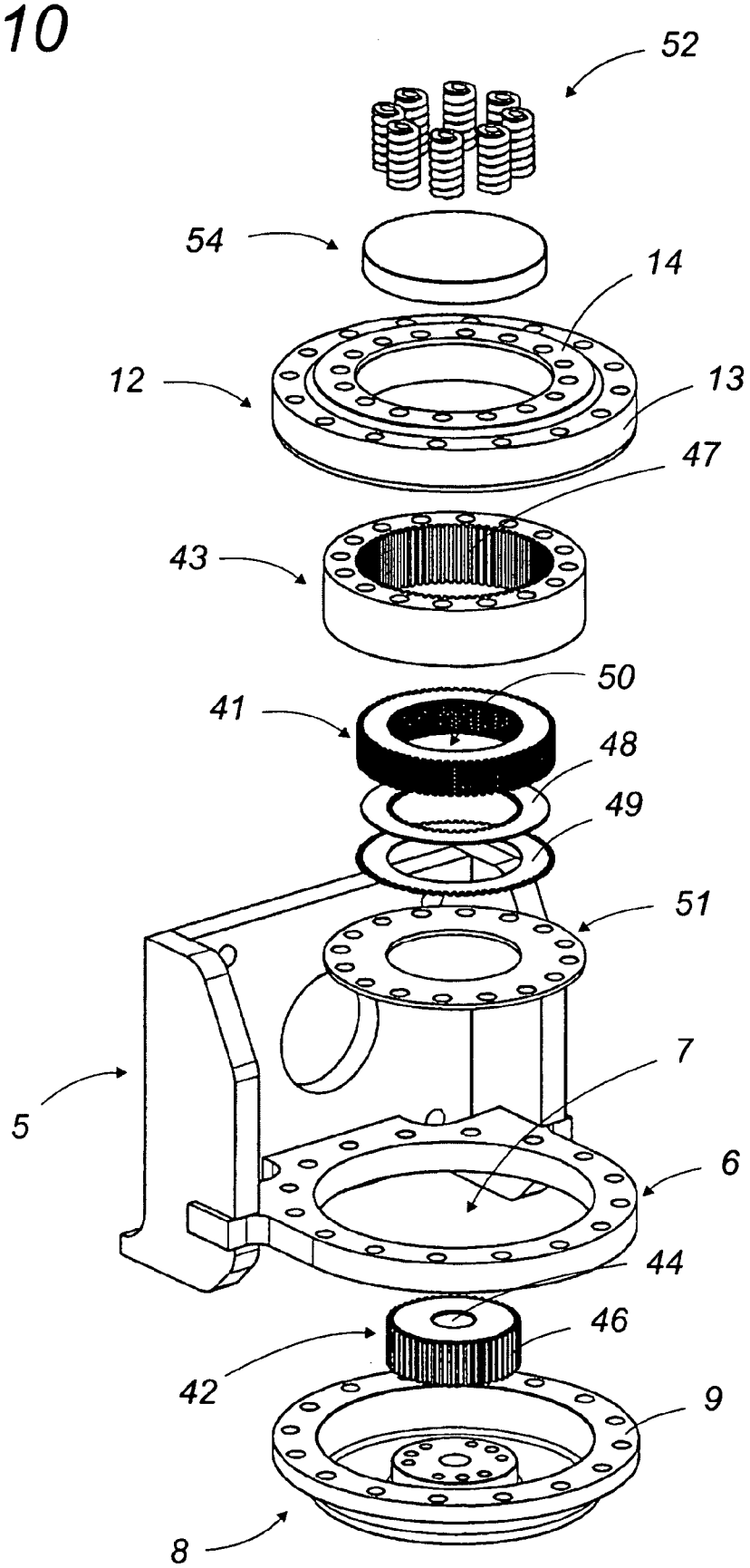
FIG. 10 is an exploded perspective of the principal elements constituting the articulation for yaw in the articulating coupling assembly according to the first, second, or third variation of the invention.

The articulating coupling assembly for damping yaw movement according to the present invention will now be described in detail with reference to FIGS. 1 through 10, which show three preferred embodiments of the invention. However, it is important to understand that these are only exemplary embodiments of the invention, described and represented as illustrations to aid comprehension, and they in no way limit the scope of the invention.

Equivalent elements shown in different drawings will bear the same reference numerals.

The coupling comprising the articulating assembly of the invention is attached to the rear of a motor vehicle 1 and allows a trailer 2 to be attached to it using tiller 3. It comprises a series of elements that are fixed in relation to the truck, articulated to a series of elements fixed in relation to the trailer, thereby enabling transmission of the three elementary movements of yaw, pitching, and rolling associated with travel.

The coupling comprises an articulating coupling assembly 4, affixed to the rear of the vehicle by means of a support plate 5. This support plate 5 may be mounted directly on the chassis of the motor vehicle 1 or it may form a part of a constructive block that is fixed in relation to the vehicle.

Support plate 5 is followed by a base 6 that preferably is essentially perpendicular to support plate 5 and may be generally ring shaped. The interior portion of base 6 thus defines an interior space 7 for receiving the different elements that constitute the articulating coupling assembly according to the invention.

Interior space 7 of this articulating assembly is closed at the lower portion by a lower support or case 8 which may be circular, comprising a peripheral rim 9 abutting the full portion of annular base 6.

At the upper portion it is closed by a covering 10, base 11 of which preferably is also circular.

Between annular base 6 and base 11 of covering 10 a bearing element bearing is interposed which may be formed of a rim of bearings 12 pivotably supporting an upper articulation and thereby allowing yaw movement. It consists of a device that functions generally like a support bearing for pivotably receiving the upper articulation. In the conventional way, the bearing rim 12 is composed of an exterior rim 13 resting on the full annular portion of base 6 and of an interior rim 14 integral with base 11 in covering 10. These two concentric rims 13 and 14 are pivotably attached to each other, forming a pivot support bearing with a series of cylindrical bearing wheels 15 interspersed between the two rims.

In order to seal it, the bearing rim 12 is preferably equipped with two annular lipped gaskets 16 and 17 each housed within a respective groove in exterior rim 13 and interior rim 14, with its lip resting on the adjacent rim.

Support plate 5, annular base 6, case 8 and exterior rim 13 may be assembled mechanically using bolts 18, for example, so as to constitute a functional assembly that is fixed in relation to motor vehicle 1 because it is integral with the rear portion of its chassis.

In the same way, interior rim 14 and covering 10 may be joined using bolts 19 and they form an assembly which pivots about an axle perpendicular to the plane of the chassis, thereby allowing yaw movement and constituting a first articulation.

Covering 10 also comprises two lateral brackets 20 extending up from base 11. These brackets 20 support an upper articulation 21 with two degrees of movement around the two other trihedral referenced axles for rolling and pitching movement associated with travel. This upper articulation may comprise a ball and socket connection. It forms a mechanical connection with trailer 3 by means of a tenon 22.

Tenon 22 is connected by any appropriate means to tiller 3 of trailer 2. It is also possible for the front end of tiller 3 to replace tenon 22 and to be connected directly with upper articulation 21 in order to dispense with a supplemental assembly, but the advantage of having modular components would be lost.

More specifically, upper articulation 21 may be formed of a transverse axle 23 resting in housings 24 in lateral brackets 20.

In the first embodiment mode shown in FIGS. 1 through 5, this axle 23 terminates in two conical extremities 25. It is laterally immobilized by means of two end braces 26 attached to covering 10, each receiving one of the conical extremities 25 of the axle in a complementary conical housing.

In the second and third embodiments shown in FIGS. 6 through 9, axle 23 terminates in the two flattened extremities 27, which are attached directly to lateral clamps 20 on covering 10, for example, by attaching them with screws 28. The end braces are therefore no longer necessary.

A person skilled in the art can obviously conceive of other variations which have not been shown.

Two complementary spherical rings 29 and 30 are aligned on the central portion of transverse shaft 23 so as to constitute a ball and socket type of assembly to permit pitching and rolling motion.

An interior ring 30 is laterally immobilized on one side by a shoulder 31 formed within axle 23 and on the other side by a screw 32. Any lateral movement near the ball and socket assimilating play due to yaw thus becomes impossible without deformation.

In the same way, exterior ring 29 is affixed to tenon 22 without any possibility of lateral play.

Because of this upper articulation 21, during pitching and rolling motion, tenon 22 can pivot relative to axle 23 and to covering 10 and thus relative to motor vehicle 1.

However, during these movements, no yaw movements can be produced at this level. They are integrally transmitted to the lower articulation by tenon 22.

For this reason, in the first and second variations shown, lateral sides 33 of tenon 22 are convex so as to always remain in cylindrical contact with the interior surface of lateral clamps 20 on covering 10.

However, due to wear or accidental striking, for example following a jolt or for other causes, there is a risk that these surfaces may no longer be preserved geometrically intact and that a slight amount of play would then exist between the covering and the tenon.

Note that it is important to maintain an absence of play in order to absorb yaw movements from the outset, that is, during the small turns, in order to prevent the oscillations from amplifying.

In a third variation of the articulating coupling assembly according to the invention, a more advantageous means of ensuring the absence of play has been used.

In this variation, tenon 22 extends into an essentially cylindrical finger 34 pivotably engaging in a ring 35. This ring 35 has a central bore 36 to receive finger 34 and two generally plane exterior lateral surfaces 37. Preferably said ring 35 may be generally square in shape.

Plane lateral surfaces 37 of ring 35 are in abutting contact with generally plane opposing lateral surfaces 38 of two wedges 39 integral with covering 10 on either side of ring 35.

This disposition permits tenon 22 to pitch and roll freely, while any yaw movement is prevented in the area of upper articulation 21 by the abutting contact, plane surface against plane surface, of ring 35 against blocking wedges 39, and is integrally transmitted to rim 12.

This variation ensures a complete absence of play during yaw movement over the entire lifespan of the articulated coupling assembly according to the invention because of the permanent, even contact between the opposing plane surfaces and because these surfaces are protected from the exterior environment.

Because of these various elements and their disposition, yaw movements on the one hand, and pitching and rolling movements on the other hand are completely disconnected, since bearing rim 12 absorbs the yaw movements and upper articulation 21 allows only pitching and rolling movements.

In addition to the functional elements already described, interior space 7 of the articulating coupling assembly 4 of the invention houses a device for absorbing yaw movements 40. The device is located inside a closed space, sheltered from attack by environmental elements. Thus, it is protected from abrasive or oily material, severe climate conditions, vandalism, or the like, thereby extending its life and improving effectiveness.

This damping device 40 is a friction device with a magnetic brake, possibly with Foucault current or the like.

The variation described below relates to a friction type damping device. In this case, it comprises at least one friction surface in the form of a disc integral with the movable portion and at least one friction surface rigidly connected to a support forming part of the rear support of the truck, or vice versa. At least one other friction surface is applied to this friction surface with a certain degree of pressure, or another more or less smooth friction surface, or some other means integral with the opposing fixed or pivoting support so as to form at least one friction-based energy degradation system that functions as a brake to dampen yaw movement.

The system offers improved effectiveness and longevity because the entire friction surface is preserved and fully active, even during pitching and rolling movement.

According to a preferred variation, this braking system with friction surfaces is made of a stack of friction discs 41 alternately connected to a central hub 42 that is fixed in relation to motor vehicle 1 or to a peripheral drum 43 that is movable in relation to the vehicle, these surfaces being applied against one another by means of a compression system.

Central hub 42 is preferably a generally cylindrical piece with a central bore 44. It is mechanically joined to case 8, for example, using bolts 45, so that it is fixed in relation to motor vehicle 1. Advantageously, hub 42 has a notched exterior wall 46 to cooperate with and block the series of discs to be immobilized relative to the motor vehicle chassis.

Peripheral drum 43 preferably takes the form of a cylindrical rim concentric with central hub 42 and larger in diameter. In order to be movable relative to the vehicle, peripheral drum 43 is joined to interior rim 14 of bearing rim 12 and through it, to covering 10, preferably with bolts 19. Advantageously, peripheral drum 43 also comprises a notched interior wall 47 designed to block the movable friction surfaces on the drum.

The stack of friction discs 41 is located between central hub 42 and peripheral drum 43. It comprises a series of fixed discs 48 and movable discs 49 superimposed alternately, one on top of the other. These discs have a central cutout 50.

Fixed discs 48 have notches on the interior periphery surrounding cutout 50 that are complementary to the notches in exterior wall 46 of hub 42. This enables them to be fixed in relation to central hub 42 and thus to the motor vehicle chassis.

Similarly, movable discs 49 have notches on the exterior peripheral rim that are complementary to the notches in interior wall 47 of drum 43, and in this way drum 43 makes them pivot, while the drum itself is made to pivot during the yawing movements of the covering through the bearing support.

Preferably, central hub 42 supports every other disc, with a movable disc 49 that is connected to peripheral drum 47 placed between them.

The lower portion of the stack of discs 41 rests on a circular plate 51 that is mechanically joined to drum 43, perhaps also by means of bolts 19.

To ensure the effectiveness of the damping device, an axial compression force is applied to stack of discs 41 in order to bring the opposing friction surfaces into contact with one another as uniformly as possible and also to make them work. It should be noted that contact occurs by making all the friction surfaces touch simultaneously. This even surface contact improves damping quality and the longevity of the friction elements.

This axial compression force may be an elastic force exerted by springs 52, which may be eight in number in the variation shown, arranged in a circle in housings 53 of covering 10.

These springs 52 contact a generally circular cupel 54 with a peripheral rim 55 having a plane subsurface and a central frame 56, both pointing downward.

By means of its peripheral rim 55, cupel 54 contacts the stack of discs 41 and presses its surface against plate 51, thus forming complete contact between the friction surfaces.

Central frame 56 of the cupel is generally cylindrical, engaging and sliding within central bore 44 of hub 42. It allows cupel 54 to pivot in relation to hub 42 in order to adapt to the yaw movement.

Advantageously, when the axial force originates from springs 52 as in the embodiments shown, it either adapts to or is regulated according to the degree of wear on the damping device. In practice, when the friction surfaces wear out, the total thickness of the stack of discs 41 decreases. Consequently, springs 52 elongate to compensate for this decrease in size associated with wear, to ensure that cupel 54 always compresses the discs, resulting in a perfectly pressurized contact between the friction surfaces.

Advantageously, case 8 may be traversed by an opening 57, preferably threaded, located opposite central bore 44 in hub 42. In operation, this opening 57 is blocked by a plug 58. When operation stops, plug 58 may be removed to insert a depth probe into cupel 54 in order to measure wear on friction discs 41.

To facilitate maneuvers such as coupling or uncoupling the trailer, a threaded axle may be inserted through threaded opening 57 and then through bore 44 until it contacts cupel 54. This axle exerts increasing pressure on cupel 54 in order to compress springs 52, thereby freeing friction discs 41.

The operation of the articulating coupling proceeds in a manner that is obvious from the preceding description. During travel, the pitching and rolling motions are supported by ball and socket articulation 21 and yaw motions by bearing rim 12.

During yaw movement, the two rims 13 and 14 of the bearing rim pivot in relation to each other, as does the assembly of elements that are mechanically connected to them, and they constitute two functional groups pivoting in relation to each other.

This first of these groups is fixed in relation to vehicle 1 and comprises support plate 5, base 6, case 8, exterior rim 13 of the bearing rim 12, central hub 42 and the assembly of fixed discs 48.

The second group is pivotably movable relative to the first group; it comprises covering 10, tenon 22, interior rim 14 of bearing rim 12, peripheral drum 43, circular plate 51 and the assembly of movable discs 49.

When yawing motion is produced, movable discs 49 driven by peripheral drum 43 pivot in relation to fixed discs 48 connected to hub 42, with which they are in close frictional contact, causing braking due to the rubbing of the pivoting motion and limiting the yaw movement, which is thereby absorbed.

Effective braking is ensured by the axial force generated by springs 52 compressing the stack of friction discs 41 by means of cupel 54 and thus forcing the opposing friction surfaces against one another. The multiplicity of friction surfaces ensures maximum braking effectiveness and reduces wear on the device.

Obviously a person skilled in the art can conceive of numerous variations of the device described above without departing from the scope of the present invention.

For example, in the embodiments shown, articulation 12 for yaw movement is located on the lower portion and articulation 21 for pitching and rolling movement, on the upper portion of the articulating coupling hitch assembly 4 of the invention. A person skilled in the art could easily conceive of a variation wherein the two articulations would be reversed, the essential feature being that the yaw pivot axle remain completely detached from the other two rolling and pitching axles.

Similarly, articulation 21 permitting pitching and rolling movement would not necessarily consist of an axle supporting a ball and socket, but it might be formed of a ball equipped with a system for blocking yaw movement, for example, or a ball with a tenon 22 immobilizing yaw movement in this area.

The friction damping device may comprise any number of discs, at a minimum, enough to ensure a lifespan compatible with the schedule of major maintenance routines. A "monodisc" variation would also be possible.

The friction surfaces of the damping device are maintained in close contact with one another by means of some type of compression system which may be a mechanical system such as a spring based system, as in the variations described. But it might also consist of a pneumatic, hydraulic, electric or other system capable of exerting axial compression force.

When this force is applied by a hydraulic, pneumatic, or electric system, it is advantageously regulated by means of a control circuit in order to adapt the intensity of the yaw-damping effect, for example, as a function of speed and/or weight transported.

However, this type of damping device is less reliable than a device equipped with a mechanical compression system. If a hydraulic, pneumatic or electric compression system fails, absorption of yaw movement virtually no longer takes place.

It is also possible to associate a damping deactivation device with a mechanical compression system. This device could reduce or interrupt damping below a certain speed when it is no longer necessary, for example, 50 km/hour, in order to facilitate maneuvering and limit wear on the friction surfaces. Such a device, which might be pneumatic, hydraulic, or electric, could exert an axial force on cupel 54 at the appropriate time in the direction opposite to the compression force exerted by springs 52, thus freeing the friction surfaces.

Such a system would be completely secure in this case because if the pneumatic, hydraulic, or electric deactivation device failed, damping would occur in every instance.

Moreover, to simplify manufacturing, the two operating groups that pivot in relation to each other comprise numerous independent elements that are mechanically joined together. Obviously, it is possible to reduce the number of pieces by forming them of a single piece. Thus, for example, central hub 52 could be formed of a single piece attaching it to case 8.

A preferred application of the articulating coupling assembly of the invention for a unit consisting of a motor vehicle and a central axle trailer has been described. However, numerous other applications are possible for other types of trailers such as, for example, motor homes, vans, and other specialized trailers.

The invention claimed is:

1. An articulating coupling (4) comprising:
a first pivot articulation (12) pivotable about a vertical axis, which facilitates only pivotal yaw movement between a motor vehicle (1) and a trailer (2), having a disc device (40) with pivoting friction surfaces for damping the pivotal yaw movement between the motor vehicle (1) and the trailer (2), the first pivot articulation (12) being enclosed within a closed space to seal the first pivot articulation (12) from incoming pollution; and
a second pivot articulation (21) pivotally coupled to the first pivot articulation (12) and pivotable about two horizontal axes with respect to the vertical pivot axis of the first pivot articulation, to facilitate only pitch movement and rolling movement between the motor vehicle (1) and the trailer (2), the second pivot articulation (21) being laterally immobilized with respect to the first pivot articulation (12) in a rigid manner to inhibit play therebetween and to transmit only the yaw movement to the first pivot articulation (12).

2. The articulating coupling according to claim 1, wherein the first pivot articulation allowing the yaw movement has a bearing rim.

3. The articulating coupling according to claim 1, wherein the second pivot articulation (21), transmits only the yaw movement to the first pivot articulation (12) and inhibits yaw movement play.

4. The articulating coupling according to claim 3, wherein an absence of yaw movement play is ensured by uniform planar contact between two planar surfaces (37, 38) of the first pivot articulation and the second pivot articulation (21) and the second pivot articulation is located vertically above the first pivot articulation (12).

5. The articulating coupling according to claim 1, wherein the second pivot articulation (21) is a spherically shaped articulation.

6. The articulating coupling according to claim 5, wherein the second pivot articulation (21) has a transverse axle (23) with two aligned rings (29, 30) that have complementary spherically shaped surfaces.

7. The articulating coupling according to claim 6, wherein the two rings (29, 30) are attached in a rigid manner to inhibit any possibility of lateral play.

8. The articulating coupling according to claim 1, wherein the disc device (40) for damping the yaw movement has at least one disc (41) with a friction surface that communicates with at least one opposing surface which is biased against the at least one disc (41) by a compression system that exerts an axial compression force on the at least one disc (41), at least one of said opposing surfaces being a friction surface.

9. The articulating coupling according to claim 8, wherein the disc device (40) for damping the yaw movement comprises a stack of discs (41) with friction surfaces, the stack of discs (41) comprises a plurality of disks (48) that are rotationally fixed with respect to the motor vehicle (1) and a plurality of disks (48) that are rotationally fixed with respect to the trailer (2) which are alternately disposed and pivot in relation to one another under the influence of the yaw movement.

10. The articulating coupling according to claim 9, wherein the stack of discs (41) with friction surfaces contains at least one fixed disc (48) that is integral with a central hub (42) that is fixed in relation to the motor vehicle (1) and at least one movable disc (49) that is integral with a peripheral drum (43) that is movable in relation to the motor vehicle.

11. The articulating coupling according to claim 10, wherein an exterior wall (46) of the central hub (42) has notches and at least one of the fixed discs (48) has complementary notches on an interior periphery around a cutout (50) so that the fixed discs (48) remain fixed as the stack of discs (41) pivot in relation to the central hub (42).

12. The articulating coupling according to claim 10, wherein an interior wall (47) of the peripheral drum (43) has notches and at least one of the movable discs (49) has complementary notches on an exterior periphery so that the peripheral drum (43) engages and pivots the movable disc (49).

13. The articulating coupling according to claim 8, wherein the compression system comprises a cupel (54) that biases the at least one disc (41) such that the friction surfaces completely contact one another.

14. The articulating coupling according to claim 8, wherein the compression system of the disc device (40) is a mechanical system.

15. The articulating coupling according to claim 14, wherein the mechanical compression system of the disc device (40) comprises at least one spring (52).

16. The articulating coupling according to claim 14, wherein the mechanical compression system of the disc device (40) cooperates with a damping deactivation device that either reduces or interrupts damping of the yaw movement below a certain travel speed.

17. The articulating coupling according to claim 16, wherein the damping deactivation device exerts axial force in a direction opposite to the compression force, thereby freeing the friction surfaces.

18. The articulating coupling according to claim 8, wherein the compression system of the disc device (40) is one of a pneumatic, hydraulic, or electric system and exerts an axial compression force.

19. The articulating coupling according to claim 18, wherein the articulating coupling further comprises a control circuit for regulating the axial compression force applied by the hydraulic, pneumatic, or electric compression system.

20. The articulating coupling according to claim 10, wherein an exterior wall (8) of the articulating coupling has a threaded transverse opening (57) located opposite a bore (44) in the central hub (42) for one of measurement of wear on the stack of discs (41) with friction surfaces or for insertion of a threaded axle to exert increasing pressure on a cupel (54) and free the stack of discs (41).

* * * * *